United States Patent Office 3,341,608
Patented Sept. 12, 1967

3,341,608
FLUORINATED NITRO ALCOHOLS AND PROCESS
Murray Hauptschein, Glenside, and Robert E. Oesterling, Flourtown, Pa., assignors to Pennsalt Chemicals Corporation, Philadelphia, Pa., a corporation of Pennsylvania
No Drawing. Filed Aug. 2, 1961, Ser. No. 128,646
6 Claims. (Cl. 260—633)

This invention relates to new fluorinated nitro alcohols and to a method for preparing them.

The addition of dinitrogen tetroxide to hydrocarbon olefins to give dinitro and nitro-nitrite addition products is well known. It is also known that the nitro-nitrite products may hydolyze to produce nitro alcohols. The reaction of dinitrogen tetroxide with perfluoro olefins $R_fCF=CF_2$ to give dinitro compounds $R_fCF(NO_2)CF_2NO_2$ and nitro carboxylic acids $R_fCF(NO_2)COOH$, is also known. In such reactions involving perfluoro olefins, however, nitro alcohols are not obtained.

In accordance with this invention, a new class of fluorine containing nitro alcohols has been discovered having the general formula $RCH(OH)CF_2NO_2$ where R may be an alkyl, a haloalkyl, or a haloaryl radical. These new difluoronitro, α-hydroxy compounds are characterized by their chemical stability, particularly where the R radical is at least one-half fluorinated.

The preferred nitro alcohols of the invention are those in which the R radical is haloalkyl, particularly those in which the haloalkyl radical is at least one-half halogenated (i.e. one-half of the hydrogens have been replaced by halogen) and in which the halogens are fluorine and/or chlorine. Most highly preferred are those nitro alcohols in which the R radical is a perfluoroalkyl, a fluorohydroalkyl, a fluorochloroalkyl, or a fluorochlorohydroalkyl radical. As used herein, perfluoro means a radical containing only fluorine and carbon. Fluorohydro means a radical containing only carbon, fluorine and hydrogen in which the molar ratio of fluorine:hydrogen is at least 1:1. A fluorochloro radical means one containing only carbon, fluorine and chlorine in which the molar ratio of fluorine:chlorine is at least 1:1. A fluorochlorohydro radical means one containing only carbon, fluorine, chlorine and hydrogen in which the molar ratio of fluorine to chlorine plus hydrogen is at least 1:1.

The number of carbon atoms in the R radical is not critical and R may contain e.g. 50 carbon atoms or more, although in most cases it will contain from 1 to about 20 and desirably 1 to 12 carbon atoms. When R is haloaryl it is preferably halophenyl; is at least one-half halogenated; and the halogens are preferably fluorine and/or chlorine.

A particularly preferred class of the fluorinated nitro alcohols of the invention are those of the formula $R'[CH_2CF_2]_nCH(OH)CF_2NO_2$ where R' is a perfluoroalkyl, a fluorohydroalkyl, a fluorochloroalkyl or a fluorochlorohydroalkyl radical, and n is an integer preferably having a value of 1 to 8. As explained hereinafter these nitro alcohols are readily prepared from telomers of vinylidene fluoride.

The new nitro alcohols of the invention may be prepared by the reaction of terminal olefins of the formula $RCH=CF_2$, where the radical R is as defined above, with dinitrogen tetroxide ($N_2O_4$) at moderately elevated temperatures of from 50 to 150° C. and preferably from 80° to 130° C. An $N_2O_4$ addition product is formed which is then hydrolyzed in water and neutralized to provide good yields of the nitro alcohol $RCH(OH)CF_2NO_2$. Although the invention does not depend on any particular mechanism, it is probable that the $N_2O_4$ addition reaction and subsequent hydrolysis proceeds in accordance with the following:

(a)
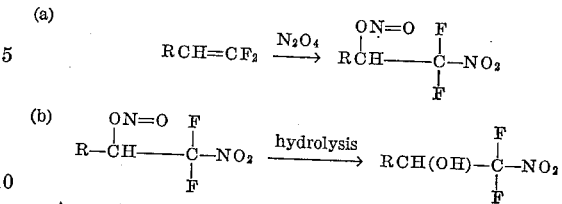

(b)
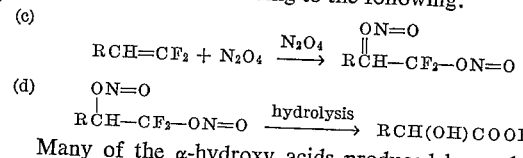

According to the above, a nitro group adds to the fluorinated carbon, and a nitrite group adds to the hydrogen-containing carbon of the double bond to give the nitro-nitrite product of Equation (a) which then hydrolyzes to the nitro alcohol according to Equation (b). This is apparently the major reaction since the nitro alcohol is obtained as the major product. [The nitro-nitrate, rather than the nitro-nitrite shown in Equations (a) and (b) may be the intermediate product in whole or in part due to the oxidizing conditions of the reaction. The nitro-nitrate would hydrolyze in the same manner.] A second reaction also occurs probably through the formation of a dinitrite addition product, which upon hydrolysis yields an α-hydroxy acid according to the following:

(c)
$$RCH=CF_2 + N_2O_4 \xrightarrow{N_2O_4} \overset{ON=O}{\underset{}{R\overset{|}{C}H-CF_2-ON=O}}$$

(d)
$$\overset{ON=O}{\underset{}{R\overset{|}{C}H-CF_2-ON=O}} \xrightarrow{hydrolysis} RCH(OH)COOH$$

Many of the α-hydroxy acids produced by such reactions are believed to be novel compounds and are the subject of the copending application of Murray Hauptschein and Robert E. Oesterling, Serial No. 129,239 filed August 4, 1961, now Patent No. 3,202,706.

The necessity for moderately elevated temperatures to procure the addition of $N_2O_4$ as in the above reactions is in contrast to the addition of $N_2O_4$ to the analogous hydrocarbon olefins $RCH=CH_2$ which proceeds readily in ether solution at low temperatures such as 0° C.

Since the reaction temperatures are well above the boiling point of $N_2O_4$ (about 20° C.), the reaction will take place at moderate superatmospheric pressures corresponding to the autogenous pressures of the reactants at the reaction temperatures, generally ranging from 50 to 500 lbs./in.² Reaction time is not critical. Generally, reaction periods from 1 to 50 hours and preferably from 5 to 20 hours give good yields and conversions. The molar ratios of the reactants are not critical, but it is preferred to use a molar excess of $N_2O_4$ to insure good conversions of the olefin to the addition product. Molar ratios of $N_2O_4$:olefin of from 1.1:1 to 1.5:1 are generally preferable.

The reaction is desirably carried out in the presence of a solvent which is unreactive to $N_2O_4$ under the reaction conditions. Without a solvent, the addition reaction is difficult to control, yields are lower, and explosion may occur. Preferred are the halogenated solvents, particularly the chlorinated or chlorofluorinated solvents, such as chloroform, methylene chloride $CH_2Cl_2$, carbon tetrachloride, trichlorotrifluoroethane, dichlorotetrafluoroethane etc. The amount of solvent is not critical and generally may be used in an amount ranging from 100 to 1000 milliliters per mole of olefin. Desirably, the reaction is carried out under substantially anhydrous conditions to avoid reactions between $N_2O_4$ and water and the possibility of other side reactions.

As is well known, dinitrogen tetroxide ($N_2O_4$) is probably an equilibrium mixture of $N_2O_4$ with various other forms of nitrogen oxides particularly $NO_2$ whose composition changes depending principally upon temperature. This behavior of $N_2O_4$ is described for example, by J. L. Riebsomer in Chemical Reviews, vol. 36, No. 2, April 1945, pages 157 et seq. As used herein, the term "dinitrogen teroxide" ($N_2O_4$) is intended to include the various equilibrium mixtures that are obtained under the reaction conditions specified herein.

In cases where R is haloalkyl or haloaryl many of the precursor olefins $RCH=CF_2$ are novel compounds. These may be prepared by the reaction of a halogenated iodide RI, where R is haloalkyl or haloaryl, with vinylidene fluoride in accordance with the following:

(e) $$RI + CH_2=CF_2 \xrightarrow{\Delta} R[CH_2CF_2]_nI$$

where $n$ is an integer. Telomerization reactions of this type are described by Hauptschein et al. (JACS, vol. 80, pages 846 to 851) and in U.S. Patent 2,975,220 of Hauptschein et al. As described more in detail in these references, the reaction is preferably carried out at elevated temperatures in the range of about 180 to 250° C. and at elevated pressures. By using an excess of telogen RI, the reaction may be controlled to give good yields of the 1:1 adduct of iodide to olefin, i.e. compounds of the type $RCH_2CF_2I$.

The iodides thus produced may then be dehydroiodinated by reaction with an ionic halide, e.g. lithium chloride, in a polar organic solvent e.g. dimethyl formamide. Such procedures are described in detail in the copending application of Murray Hauptschein et al., Serial No. 53,878, filed September 6, 1960, now Patent No. 3,116,337. Where the precursor iodide contains one vinylidene fluoride unit, olefins of the formula $RCH=CF_2$ are obtained. Where the precursor iodide contains two or more repeating vinylidene fluoride units, the olefins produced by dehydroiodination will have the formula $R[CH_2CF_2]_{n-1}CH=CF_2$.

Typical examples of precursor olefins and the nitro alcohols that are obtained therefrom in accordance with the invention are the following:

| Precursor Olefin | Nitro Alcohol |
|---|---|
| $CF_3CH=CF_2$ | $CF_3CH(OH)CF_2NO_2$ |
| $CF_3CH_2CF_2CH=CF_2$ | $CF_3CH_2CF_2CH(OH)CF_2NO_2$ |
| $CF_3CF_2CF_2CH=CF_2$ | $CF_3CF_2CF_2CH(OH)CF_2NO_2$ |
| $CF_3CF_2CF_2CH_2CF_2CH=CF_2$ | $CF_3CF_2CF_2CH_2CF_2CH(OH)CF_2NO_2$ |
| $C_3F_7[CH_2CF_2]_3CH=CF_2$ | $C_3F_7[CH_2CF_2]_3CH(OH)CF_2NO_2$ |
| $CF_3\overset{\underset{\mid}{CF_3}}{C}FCH=CF_2$ | $CF_3\overset{\underset{\mid}{CF_3}}{C}FCH(OH)CF_2NO_2$ |
| $CH_3CH=CF_2$ | $CH_3CH(OH)CF_2NO_2$ |
| $CH_3CH_2CH=CF_2$ | $CH_3CH_2CH(OH)CF_2NO_2$ |
| $C_2F_5\overset{\underset{\mid}{CF_3}}{C}FCH=CF_2$ | $C_2F_5\overset{\underset{\mid}{CF_3}}{C}FCH(OH)CF_2NO_2$ |
| $CF_3\overset{\underset{\mid}{CF_2Cl}}{C}FCH=CF_2$ | $CF_3\overset{\underset{\mid}{CF_2Cl}}{C}FCH(OH)CF_2NO_2$ |
| $CF_2ClCFClCH=CF_2$ | $CF_2ClCFClCH(OH)CF_2NO_2$ |
| $CF_2Br\overset{\underset{\mid}{CF_3}}{C}FCH=CF_2$ | $CF_2Br\overset{\underset{\mid}{CF_3}}{C}FCH(OH)CF_2NO_2$ |
| 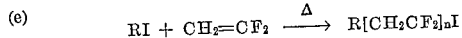 | 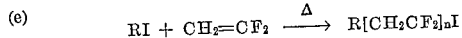 |
| $CF_2ClCH=CF_2$ | $CF_2ClCH(OH)CF_2NO_2$ |
| $CHF_2CH=CF_2$ | $CHF_2CH(OH)CF_2NO_2$ |

The following examples illustrate several specific embodiments of the invention:

EXAMPLE 1

The precursor olefin $CF_3CF_2CF_2CH=CF_2$ is prepared by the dehydroiodination of the iodide $$CF_3CF_2CF_2CH_2CF_2I$$

according to the procedures described in the above mentioned copending application Serial No. 53,878. A 46.4 gram (0.2 mole) portion of the olefin is added to 100 milliliters of $CCl_2FCClF_2$ and the resulting solution cooled to 0° C. Into this solution there is condensed 27.6 grams (0.3 mole) of dinitrogen tetroxide ($N_2O_4$) and the mixture is then dried over $P_2O_5$ at 0° C. for two to three hours. The solution is then filtered into a 300 milliliter stainless steel autoclave chilled to $-10°$ CC. which is then sealed and heated at 100° C. for 16 hours with agitation. The autoclave is then cooled in an ice bath and the contents transferred to a 200 milliliter Vigreaux still. The excess dinitrogen tetroxide and chlorofluorinated solvent are distilled from the mixture leaving 40 grams of a yellow oil.

This product is then stirred with 200 milliliters of water at room temperature and then neutralized with sodium carbonate. An insoluble pale yellow oil separates. The water layer is extracted twice with 40 milliliter portions of diethyl ether. The ether extracts are combined with the separated oil, the mixture dried over anhydrous magnesium sulfate, and subsequently evaporated to provide 24 grams (40% yield) of the nitro alcohol $$C_3F_7CH(OH)CF_2NO_2$$

After redistillation in vacuo, this nitro alcohol is found to have a boiling point of 62° C. at 44 mm. Hg, a refractive index $n_D^{25}$ 1.3240.

*Analysis.*—Calculated for $C_5H_2F_9NO_3$: C, 20.35; H, 0.68; N, 4.75. Found: C, 20.56; H, 0.86; N, 4.99.

The infrared spectrum of this compound shows the strong symmetrical N→O stretching absorption at $6.25\mu$ with an asymmetrical stretching absorption at $7.42\mu$. A typical hydroxyl absorption band is present at $2.88\mu$. The ultraviolet spectrum in 95% ethanol shows a maximum at 283 m$\mu$ which is characteristic of fluoronitro compounds.

The alkaline aqueous layer remaining after ether extraction of the nitro alcohol is acidified with dilute hydrochloric acid and extracted three times with 40 milliliter portions of diethyl ether. The ether extract is dried over anhydrous magnesium sulfate and evaporated to give 10 grams (20% yield) of a pale yellow oil which crystallizes on standing over night. Recrystallization from a benzene-light petroleum ether solvent gives colorless needles of the pure hydroxy acid $C_3F_7CH(OH)COOH$ having a melting point of 108–109° C. The infrared spectrum of this compound is characteristic of hydroxy-acid absorption and consistent with the above structure.

EXAMPLE 2

The N-phenyl carbamate derivative of the nitro alcohol prepared as in Example 1 is obtained as follows. In 20 milliliters of carbon tetrachloride there is dissolved 6 grams of the nitro alcohol of Example 1, and 3.6 grams of phenyl isocyanate together with 3 drops of triethylamine. The mixture is refluxed for 30 minutes. On cooling, a heavy precipitate is formed which is filtered and dried yielding 6.8 grams of a pale yellow solid. Recrystallization from a benzene-light petroleum ether solvent gives colorless needles of the pure 2-hydro-1-nitro-perfluoro-amyl-2-N-phenyl carbamate, $$CF_3CF_2CF_2CH[O\overset{\overset{O}{\|}}{C}NHC_6H_5]CF_2NO_2$$

having a melting point of 88–89° C.

*Analysis.*—Calculated for $C_{12}H_7F_9N_2O_4$: C, 34.79; H, 1.70; N, 6.76. Found: C, 34.65; H, 2.17; N, 6.57.

EXAMPLE 3

The precursor olefin $CF_3CF_2CF_2CH_2CF_2CH=CF_2$ is prepared by the dehydroiodination of $$CF_3CF_2CF_2CH_2CF_2I$$

as described in the above mentioned copending application Ser. No. 53,878. A 50 gram portion (0.17 mole) of the olefin and 23 grams of $N_2O_4$ are dissolved in 100 milliliters of CCl₂FCClF₂ according to the procedures described in Example 1. The mixture is placed in a 300 milliliter stainless steel autoclave which is sealed and then heated at 100° C. for 15 hours. The autoclave is then cooled to room temperature, vented, and the liquid contents poured into a Vigreaux still where the excess N₂O₄ and chlorofluorinated solvent is distilled off leaving 61 grams of a liquid product (92% yield). The crude product is added to 200 milliliters of water, stirred and then neutralized with sodium bicarbonate. An insoluble oil layer separates from an aqueous layer. The aqueous layer is extracted three times with diethyl ether. The ether extract is added to the oil layer, the mixture dried over anhydrous magnesium sulfate and evaporated to give 35 grams (59% yield) of a water insoluble oil having the formula $CF_3CF_2CF_2CH_2CF_2CH(OH)CF_2NO_2$. On redistillation in vacuo, this product is a pure colorless oil having a boiling point of 72° C. at 4 mm. Hg and a refractive index $n_D^{25}$ 1.3347.

*Analysis.*—Calculated for $C_7H_4F_{11}NO_3$: C, 23.41; H, 1.12; N, 3.90. Found: C, 23.79; H, 1.20; N, 3.86.

The infrared spectrum of this compound shows bands at 2.86μ and 6.25μ characteristic respectively of the hydroxyl and nitro groups.

The aqueous alkaline layer from the above reaction is acidified with dilute hydrochloric acid and extracted with diethyl ether to give 10 grams (19% yield) of a base soluble yellow oil which crystallizes on standing, this being the α-hydroxy acid $$CF_3CF_2CF_2CH_2CF_2CH(OH)COOH$$

Recrystallization of this product from a benzene-light petroleum ether solvent gives colorless needles having a melting point of 82 to 83° C.

*Analysis.*—Calculated for $C_7H_5F_9O_3$: C, 27.28; H, 1.63. Found: C, 27.00; H, 1.69.

The infrared spectrum of this compound shows typical (OH) absorption at 2.88μ and carbonyl absorption at 5.8μ.

EXAMPLE 4

The syanurate derivative of the nitro alcohol $$CF_3CF_2CF_2CH_2CF_2CH(OH)CF_2NO_2$$

prepared as described in Example 3 is obtained as follows:

A 7.2 gram portion of the nitro alcohol is converted to the sodium salt by reacting with 0.6 gram of sodium hydride in 40 milliliters of anhydrous diethyl ether. To this mixture there is added 1.1 grams of cyanuric chloride and the mixture stirred for 1 hour at room temperature. The reaction mixture is then poured into an ice slush and the ether layer is separated, dried and evaporated giving 7.5 grams of a heavy yellow oil. The latter is vacuum distilled giving a pale yellow viscous oil boiling at 175 to 185° C. at 0.1 mm. Hg. The infrared spectrum is consistent with the tris(polyfluoronitroalkyl) cyanurate:

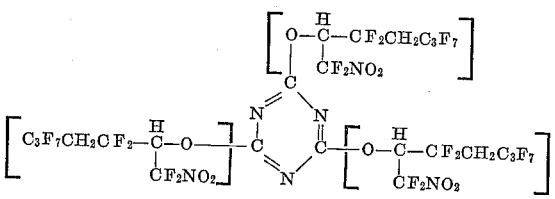

*Analysis.*—Calculated for $C_{24}H_9F_3N_6O_9$: N, 7.29. Found: N, 7.27.

EXAMPLE 5

The precursor olefin $CF_3CH=CF_2$ in this example is prepared by the dehydroiodination of $CF_3CH_2CF_2I$ according to the procedures described in the aforementioned copending application Ser. No. 53,878. A solution of 27.6 grams (0.3 mole) of dinitrogen tetroxide in 100 milliliters of $CF_2ClCFCl_2$ is placed in a 300 milliliter stainless steel autoclave after which 26.4 grams (0.2 mole) of $CF_3CH=CF_2$ is added by vacuum transfer. The autoclave is then heated at 90 to 100° C. for 17 hours while shaking. The autoclave is cooled to room temperature and upon venting 2.5 grams of unreacted olefin is collected. The liquid product from the autoclave is stirred with 100 milliliters of water and then neutralized with sodium bicarbonate. The water insoluble layer is separated, dried and the $CF_2ClCFCl_2$ solvent removed by evaporation. The water layer is extracted three times with diethyl ether; the ether extract is dried and the ether removed by evaporation. The pale yellow oil residues from these evaporations are combined to provide 16 grams of product which is then vacuum distilled to give a colorless liquid consisting of the constant boiling etherate of the nitro alcohol $CF_3CH(OH)CF_2NO_2$ having the formula $[CF_3CH(OH)CF_2NO_2]_3 \cdot C_2H_5OC_2H_5$, boiling at 70° C. at 100 mm. Hg and having a refractive index $n_D^{29}$ 1.3351.

*Analysis.*—Calculated for $C_{13}H_{16}F_{15}N_3O_{10}$: C, 23.7; H, 2.44; F, 43.2; N, 6.37; ethoxyl, 6.84. Found: C, 24.4; H, 2.78; F, 43.0; N, 6.35; ethoxyl, 6.92.

The infrared spectrum of this compound confirms the above structure showing strong bonded —OH at 3.2μ; a strong symmetrical N–O stretching at 6.26μ and C–F stretching in the 7.5–10μ region.

EXAMPLE 6

The phenyl isocyanate derivative of the nitro alcohol $CF_3CH(OH)CF_2NO_2$ is obtained as follows: The etherate of the nitro alcohol prepared as in Example 5 is mixed with an equimolar amount of freshly distilled phenyl isocyanate and a small amount of triethylamine as a catalyst. The reaction mixture is warmed for a few minutes on a steam bath and then cooled in ice to solidify the product. Recrystallization from petroleum ether gives white needles having a melting point of 88 to 89° C., this being the n-phenyl carbamate:

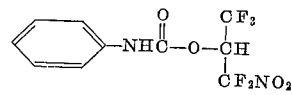

*Analysis.*—Calculated for $C_{10}H_7F_5N_2O_4$: C, 38.24; H, 2.25; N, 8.92. Found: C, 38.05; H, 2.27; N, 8.38.

The nitro alcohol $CF_3CH(OH)CF_2NO_2$ is obtained from the above N-phenyl carbamate derivative by mild basic hydrolysis of the carbamate, neutralization of the resulting solution followed by distillation and drying to obtain the nitro alcohol.

EXAMPLE 7

The precursor olefin $CF_3CH_2CF_2CH=CF_2$ in this example is prepared by the dehydroiodination of the iodide $CF_3CH_2CF_2CH_2CF_2I$ according to the procedures described in the above mentioned copending application Serial No. 53,878. A 49 gram (0.25 mole) portion of the olefin and 32 grams (0.35 mole) of N₂O₄ are dissolved in 150 milliliters of $CF_2ClCFCl_2$ and the mixture dried over P₂O₅ and then filtered into a 300 milliliter stainless steel autoclave. The autoclave is sealed and heated with shaking at 100° C. for 5 hours at a pressure of 125 lbs./in.² gage. The autoclave is then cooled and vented and the liquid content poured into water, stirred and then neutralized with sodium bicarbonate. A water insoluble oil layer separates and after drying and evaporation to drive off $CFCl_2CF_2Cl$ there is obtained 21 grams of a yellow oil of the formula $$CF_3CH_2CF_2CH(OH)CF_2NO_2$$

Upon redistillation in vacuo this nitro alcohol is found to have a boiling point of 66° C. at 6 mm. Hg and a refractive index $n_D^{27}$ 1.3478.

The aqueous alkaline layer is neutralized and extracted with diethyl ether. After drying the ether extract over anhydrous magnesium sulfate and evaporation of the ether the hydroxy acid $CF_3CH_2CF_2CH(OH)COOH$ is obtained.

EXAMPLE 8

Following the procedures described in Example 5, the olefin $CH_3CH=CF_2$ is reacted with a slight excess of $N_2O_4$ in a sealed autoclave in carbon tetrachloride as a solvent at a temperature of 75° C. for 10 hours. The liquid autoclave contents are stirred in water, neutralized and the water insoluble layer then dried and evaporated to provide the liquid nitro alcohol $$CH_3CH(OH)CF_2NO_2$$

EXAMPLE 9

Following the procedure described in Example 1, the olefin $$C_2F_5\overset{CF_3}{\underset{|}{C}}FCH=CF_2$$

(prepared by the dehydroiodination of $$C_2F_5\overset{CF_3}{\underset{|}{C}}FCH_2CF_2I)$$

is reacted with $N_2O_4$ in a molar ratio of olefin:$N_2O_4$ of 1:1.5 while dissolved in trichlorotrifluoroethane as a solvent at a temperature of 100° C. for 15 hours. The nitro alcohol $$C_2F_5\overset{CF_3}{\underset{|}{C}}FCH(OH)CF_2NO_2$$

boiling at approximately 85° C. at 40 mm. Hg is obtained.

EXAMPLE 10

Following the procedures previously described, the olefin $$CF_3\overset{CF_2Cl}{\underset{|}{C}}FCH=CF_2$$

is reacted with a slight molar excess of $N_2O_4$ in a trichloro-trifluoroethane solvent at a temperature of 90° C. The nitro alcohol $$CF_3\overset{CF_2Cl}{\underset{|}{C}}FCH(OH)CF_2NO_2$$

boiling at approximately 80° C. at 40 mm. Hg is obtained.

EXAMPLE 11

Following the procedures previously described, the olefin $CF_2ClCFClCH=CF_2$ (prepared by the dehydroiodination of $CF_2ClCFClCH_2CF_2I$) is reacted with a slight molar excess of $N_2O_4$ in a sealed autoclave in trifluorotrichloroethane as a solvent at a temperature of 90° C. The nitro alcohol $CF_2ClCFClCH(OH)CF_2NO_2$, boiling at approximately 100° C. at 40 mm. Hg is obtained.

The difluoronitro, α-hydroxy compounds of the invention are characterized by their chemical stability. In contrast, the hydrocarbon analogues, containing the $$-CH(OH)CH_2NO_2$$

group, quite readily undergo reactions involving the hydrogens on the nitro containing carbon (which are quite acidic in character) and involving the adjacent hydroxy group. Thus, the hydrocarbon analogues readily undergo dehydration to form terminal olefins $RCH=CHNO_2$. In the presence of strong base, the hydrocarbon analogues cleave quite readily at the nitro containing carbon to form aldehydes. In contrast, the nitro alcohols of the invention dehydrate with difficulty or not at all and are quite resistant to cleavage at the terminal nitro bearing carbon both in the presence of strong acids and bases. Thus, for example, the nitro alcohols of Examples 1, 3 and 7 showed no apparent change when heated with concentrated sulfuric acid at boiling. Upon recovery of the nitro alcohols from the acid and neutralization, they remained colorless and showed no change in index of refraction or in their infrared spectrum. They did not undergo etherification under these stringent conditions. When exposed to strong base, namely a hot 20% solution of KOH, the nitro alcohol of Example 1 failed to undergo cleavage at the nitro bearing carbon, but was recovered unchanged.

The fluorine-containing nitro alcohols of the invention, particularly those containing a relatively high proportion of fluorine in the molecule as a whole, are useful as thermally and chemically stable lubricants, hydraulic fluids, heat transfer fluids and the like. They are also useful as rocket propellant additives, as intermediates for explosives, (e.g. through reaction with phosgene to form carbonate esters) and as intermediates for the preparation of cyanurates and esters in general, many of which in turn are useful as lubricants, hydraulic fluids, heat transfer fluids and the like. The perfluoroalkyl nitro alcohols of the invention $RCH(OH)CF_2NO_2$ where R is a perfluoroalkyl radical having from 3 to 12 carbon atoms are a particularly valuable class, having unusual surface properties imparted by the perfluorocarbon portion of the molecule.

We claim:
1. A method for preparing fluorine containing nitroalcohols which comprises the steps of reacting an olefin of the formula $RCH=CF_2$, in which R is a radical having from 1 to 20 carbon atoms selected from the class of alkyl radicals and haloalkyl radicals in which the halogens are selected from the class consisting of fluorine and chlorine, with dinitrogen tetroxide at a temperature of from 50° to 150° C. in the presence of a halogenated solvent selected from the class consisting of chlorinated and chlorofluorinated solvents, which solvent is unreactive with dinitrogen tetroxide under the reaction conditions, and then hydrolysing the resulting product to produce a fluorine containing nitro alcohol of the formula $RCH(OH)CF_2NO_2$, said process being carried out in a closed vessel at a pressure of from 50 to 500 lbs. per square inch.

2. Fluorine containing nitro alcohols having the formula $RCH(OH)CF_2NO_2$ in which R is a radical having from 1 to 20 carbon atoms selected from the group consisting of perfluoroalkyl, chlorofluoroalkyl, and R' $(CH_2CF_2)_n$ where R' is selected from the group consisting of perfluoroalkyl and chlorofluoroalkyl and $n$ is an integer from 1 to 8, said nitro alcohols being strongly resistant to dehydration, to etherification and to cleavage at the terminal nitrobearing carbon in the presence of strong acids and bases.

3. A fluorine containing nitro alcohol as recited in claim 2 in which said R radical is one having from 1 to 12 carbon atoms.

4. The fluorine containing nitro alcohol $$CF_3CH(OH)CF_2NO_2$$

5. A fluorine containing nitro alcohol of the formula $C_3F_7CH_2CF_2CH(OH)CF_2NO_2$.

6. The fluorine containing nitro alcohol $$CF_3CH_2CF_2CH(OH)CF_2NO_2$$

References Cited

UNITED STATES PATENTS 2,811,560 10/1957 McKinnis _____ 260—644
2,999,119 9/1961 McKinnis _____ 260—644

FOREIGN PATENTS 562,550 9/1958 Canada.

OTHER REFERENCES

Cook et al., Jr. Am. Chem. Soc., vol. 76 (1954), pp. 83–87.

LEON ZITVER, *Primary Examiner.*

CHARLES B. PARKER, *Examiner.*

A. H. SUTTO, M. B. ROBERTO, J. E. EVANS,
*Assistant Examiners.*